United States Patent [19]
Yonnet et al.

[11] Patent Number: 5,691,586
[45] Date of Patent: Nov. 25, 1997

[54] SYSTEM FOR PROVIDING ROTARY DRIVE BETWEEN TWO MECHANICAL MEMBERS BY MEANS OF MAGNETIC COUPLING, AND A FLUID METER INCLUDING SUCH A SYSTEM

[75] Inventors: Jean-Paul Yonnet, Meylan; Jérôme Delamare, Grenoble, both of France

[73] Assignee: Schlumberger Industries, S.A., Montrouge, France

[21] Appl. No.: 372,091

[22] Filed: Jan. 13, 1995

[30] Foreign Application Priority Data

Jan. 13, 1994 [FR] France .................. 94 00331

[51] Int. Cl.$^6$ .................. H02K 49/06; H02K 5/00
[52] U.S. Cl. .................. 310/75 D; 310/103; 310/104; 417/420
[58] Field of Search .................. 310/75 D, 118, 310/103, 104; 464/29; 417/420; 73/253, 254, 260

[56] References Cited

U.S. PATENT DOCUMENTS

| | | | |
|---|---|---|---|
| 3,662,600 | 5/1972 | Rosano, Jr. et al. | 73/257 |
| 3,936,683 | 2/1976 | Walker | 310/103 |
| 4,065,234 | 12/1977 | Yoshiyuki et al. | 417/420 |
| 4,107,992 | 8/1978 | Bateman et al. | 73/260 |
| 4,163,164 | 7/1979 | Pieters | 310/103 |
| 4,207,485 | 6/1980 | Silver | 310/104 |
| 4,247,792 | 1/1981 | Klicks et al. | 310/104 |
| 5,017,102 | 5/1991 | Shimaguchi et al. | 417/420 |
| 5,201,642 | 4/1993 | Hinckley | 417/420 |
| 5,376,862 | 12/1994 | Stevens | 310/75 D |

*Primary Examiner*—Steven L. Stephan
*Assistant Examiner*—Tran Ngoc Nguyen
*Attorney, Agent, or Firm*—Leonard W. Pojunas

[57] ABSTRACT

The present invention relates to a system for driving two mechanical members in rotation about an axis by magnetic coupling of the attractive type, the system comprises respective magnetic elements secured to each of said mechanical members, the two magnetic elements being concentric, one of them being made up of two identical magnetic rings of minimum radius $R_3$ and of maximum radius $R_4$, and the other one of them being made up of a magnetic ring having a minimum radius $R_1$ and a maximum radius $R_2$, with its midplane perpendicular to the axis of rotation being offset by a distance d from the midplanes of each of said two identical rings. Each ring possesses magnetization in a direction contained in a plane that is perpendicular to the axis of rotation. Each ring also possesses N magnetic poles uniformly distributed around said axis of rotation. The ratio $2d/|(R_3+R_4)-(R_1+R_2)|$ lies in the range 0.2 to 0.8.

11 Claims, 6 Drawing Sheets

SYSTEM FOR PROVIDING ROTARY DRIVE BETWEEN TWO MECHANICAL MEMBERS BY MEANS OF MAGNETIC COUPLING, AND A FLUID METER INCLUDING SUCH A SYSTEM

The present invention relates to a system for providing rotary drive about an axis between two mechanical members by means of magnetic coupling, and it also relates to a fluid meter including such a system.

BACKGROUND OF THE INVENTION

In various sectors of industry, and in particular in that of metering, and more particularly in the field of fluid metering, use is made of a drive system relying on magnetic coupling to transmit rotary motion between two mechanical members on a common axis but situated on opposite sides of a non-magnetic wall, and immersed in respective fluids having specific physico-chemical characteristics.

Each of the members is provided with a magnetic element, such that the magnetic interaction between the magnetic elements establishes magnetic coupling. When one of the members, e.g. the shaft of a turbine in a water meter, is caused to rotate about its axis, then the other member, e.g. a second shaft in alignment with said first shaft and connected to a totalizer, is caused in turn rotate because of the magnetic interaction between the two magnetic elements that provide the magnetic coupling.

The magnetic element of the magnetic coupling that causes the other magnetic element of said magnetic coupling to rotate is known as the "driving" element, whereas the other element is known as the "driven" element.

In such a drive system based on magnetic coupling, it is necessary to provide respective mechanical guides for guiding each of the magnetic elements in its rotary motion. In order to improve the performance of fluid meters, and in particular their sensitivity, drive systems based on magnetic coupling are being subjected to retirements that are more and more difficult to satisfy.

Such a drive system based on magnetic coupling must transmit the greatest possible mechanical torque and must have an equilibrium position that is as stable as possible, which means, in particular, that the magnetic forces applied between the two magnetic elements of the magnetic coupling must cancel in all three space dimensions.

When the resultant of the forces is not zero, which is true of nearly all existing systems, then forces are observed to appear on the respective mechanical guides of the magnetic elements, thereby setting up mechanical friction which leads to wear of said mechanical guides and also to a reduction in the sensitivity of the fluid meter that includes said drive based on magnetic coupling.

There are two main families of known drive systems based on magnetic coupling.

The first of these families relates to "face-to-face" drive systems based on drive by magnetic coupling in which the magnetic elements are axially offset rings on a common axis and possessing N-pole axial magnetization, where N is even. Each of the rings has a series of N magnetic sectors regularly distributed around a circumference of the ring. The rings are disposed facing each other along the axis in such a manner that the north pole of one of the magnetic sectors of one of the rings faces the south pole of one of the magnetic sectors of the other ring, with rotation of the first ring causing the second ring to rotate. That configuration is stable radially, but it is unstable axially. The sensitivity of a fluid meter including such a drive system is limited because of mechanical or magnetic eccentricities that give rise to lateral forces on the mechanical guides.

The second family relates to "concentric" drive systems based on a magnetic coupling in which the magnetic elements are concentric rings having N-pole radial magnetization, where N is even, each of the rings having a series of N magnetic sectors regularly distributed around a circumference of the ring in such a manner that each magnetic sector of one ring faces a magnetic sector of the other ring, with north poles on one ring facing south poles on the other. When one of the rings is caused to rotate, the other is driven in rotation by the attraction between the magnets.

This configuration, for which there exists only one position in which axial forces cancel, is stable axially, but presents a large amount of instability radially.

Because of this large radial instability, lateral magnetic attraction forces can bear on the drive system, in particular because of the mechanical clearances required for operation, and this lateral attraction is taken up by the mechanical guides for the rings, thereby generating friction forces.

European patent No. 0 034 992 discloses a system for driving two mechanical members in rotation about an axis by means of magnetic coupling, which system includes respective magnetic elements secured to each of the mechanical members, with each of the said magnetic elements being disposed over an area of different mean radius. One of the elements has two sets of magnets each comprising a plurality of magnets distributed around the axis. The two sets are axially offset and are disposed on axially opposite sides of a set of magnets that are likewise distributed about the axis and that constitute the other magnetic element. In one embodiment of that drive system, the magnets of one of the elements are magnetized axially while the magnets of the other element are magnetized radially. The above drive system has the advantage of being subject to no axial or radial force, thereby reducing wear of the mechanical guides for the magnetic elements. However, that drive system is not suitable for certain applications, particularly when little axial space is available.

OBJECTS AND SUMMARY OF THE INVENTION

The present invention seeks to remedy the drawbacks mentioned above by proposing a system for driving two mechanical members in rotation about an axis by means of magnetic coupling, and also a fluid meter that includes such a system, the system and the meter being simple and of improved performance, in particular in terms of the stability of the drive provided by magnetic coupling, and thus in terms of the sensitivity of said fluid meter, and also in terms of the ratio of weight to torque transmitted by said system.

The present invention thus provides a drive system for rotating two mechanical members about an axis by means of magnetic coupling, the system comprising a magnetic element secured to each of said mechanical members, the two magnetic elements being concentric, the first of said magnetic elements possessing N magnetic poles regularly distributed about the axis of rotation in a ring having a minimum radius $R_1$ and a maximum radius $R_2$, where N is even, the second magnetic element possessing N magnetic poles regularly distributed about said axis of rotation in a first ring and N magnetic poles regularly distributed about the axis of rotation in a second ring identical to the first ring, where both rings have a minimum radius $R_3$ and a maximum radius $R_4$, said rings being mechanically secured to each other and each having a respective midplane perpendicular to the axis of rotation that is axially offset by a distance d from the midplane of the ring of the first magnetic element in such a manner as to lie on opposite axial sides of said first magnetic element, wherein its magnetic coupling is of the attractive type, the magnetization of each magnetic element having a direction that is contained in a plane perpendicular to the axis of rotation, and wherein the ratio $2d/|(R_3+R_4)-(R_1+R_2)|$ lies in the range 0.2 to 0.8.

In this configuration, one of the magnetic elements is placed inside the other, and in the rest position of the drive system, the poles of the inner element face the opposite-nature poles of the outer element. Thus, when one of the mechanical members carrying one of the magnetic elements begins to rotate about the axis of rotation, the other magnetic element, and thus the corresponding member, are caused to rotate because of the attraction forces that act between the elements. The disposition of the magnetic elements in accordance with the invention is advantageous since it allows the inner ring to move axially or radially relative to the outer ring without generating a large axial or radial force.

According to preferred characteristics of the invention:

the ratio $2d/|(R_3+R_4)-(R_1+R_2)|$ preferably lies in the range 0.3 to 0.65 when $h_1/(R_2-R_1)$ and $h_2/(R_4-R_3)$ lie in the range 1.5 to 0.66, $h_1$ and $h_2$ being the axial or height dimensions respectively of the ring of the first magnetic element and of each of the rings of the second magnetic element;

the ratio $2d/|(R_3+R_4)-(R_1+R_2)|$ lies even more preferably in the range 0.35 to 0.5, when each of the dimensions $h_1,(R_2-R_1)$, $h_2$, and $(R_4-R_3)$ is perceptibly less than $|R_3-R_2|/4$.

In an embodiment of the invention, the radii $R_1$ and $R_2$ are smaller than the minimum radius $R_3$.

In a variant of the invention, the radii $R_1$ and $R_2$ are greater than the maximum radius $R_4$.

In a preferred embodiment of the invention, at least one of the magnetic elements is magnetized in continuous manner.

The magnetization of each magnetic element varies as a function of angular position in such a manner that, for a given angular position σ, the direction $α_1$ of the magnetization of the magnetic element having the larger maximum radius satisfies the relationship $α_1=½Nσ+σ$ and the direction $α_2$ of the magnetization of the other magnetic element satisfies the relationship $α_2=-½Nσ+σ$.

In a variant, the magnetization of each magnetic element has a direction that is substantially radial.

In another variant embodiment of the invention, at least one of the magnetic elements is magnetized discontinuously and the ring(s) of said magnetic element is (are) constituted by an even number of magnetic ring portions.

The magnetization of each magnetic ring portion has a direction that is uniform and substantially radial.

In yet another variant, the magnetization of each magnetic element varies as a function of angular position in such a manner that, for a given angular position σ, the direction $α_1$ of the magnetization of the magnetic element having the larger maximum radius satisfies the relationship $α_1=½Nσ+σ$ and the direction $α_2$ of the magnetization of the other magnetic element satisfies the relationship $α_2=-½Nσ+σ$.

According to other characteristics of the invention:

the number N of poles is preferably equal to 4;

the midplane of the first magnetic element substantially coincides with that of the second magnetic element;

in a plane containing the axis of rotation, the right cross-section of each ring is substantially square or rectangular in shape.

According to yet other characteristics:

at least one spacer-forming part is disposed between the two magnetic rings of the second magnetic element;

the spacer-forming part is a cylindrical wall;

the spacer-forming part is made of magnetic material;

the magnetic material of the cylindrical wall is magnetized in the same manner as the second magnetic element;

the cylindrical wall has a maximum radius that is less than $R_4$ and a minimum radius that is equal to $R_3$;

the cylindrical wall has a maximum radius equal to $R_4$ and a minimum radius greater than $R_3$;

the spacer-forming part is made of non-magnetic material;

the cylindrical wall has a maximum radius equal to $R_4$ and a minimum radius equal to $R_3$.

A particularly advantageous application of the drive system by means of magnetic coupling lies in fluid meters that comprise first and second chambers separated by a fluid-tight wall that forms a housing containing one of the magnetic elements, with the other magnetic element surrounding said housing.

In such a fluid meter, each mechanical member includes a shaft, the shaft carrying the magnetic element that is contained in the housing being connected to a totalizer, while the other shaft carrying the other magnetic element forms a portion of an axial turbine.

BRIEF DESCRIPTION OF THE DRAWINGS

Other characteristics and advantages appear from the following description given purely by way of non-limiting illustration and made with reference to the accompanying drawings, in which.

MORE DETAILED DESCRIPTION

Figure 1:
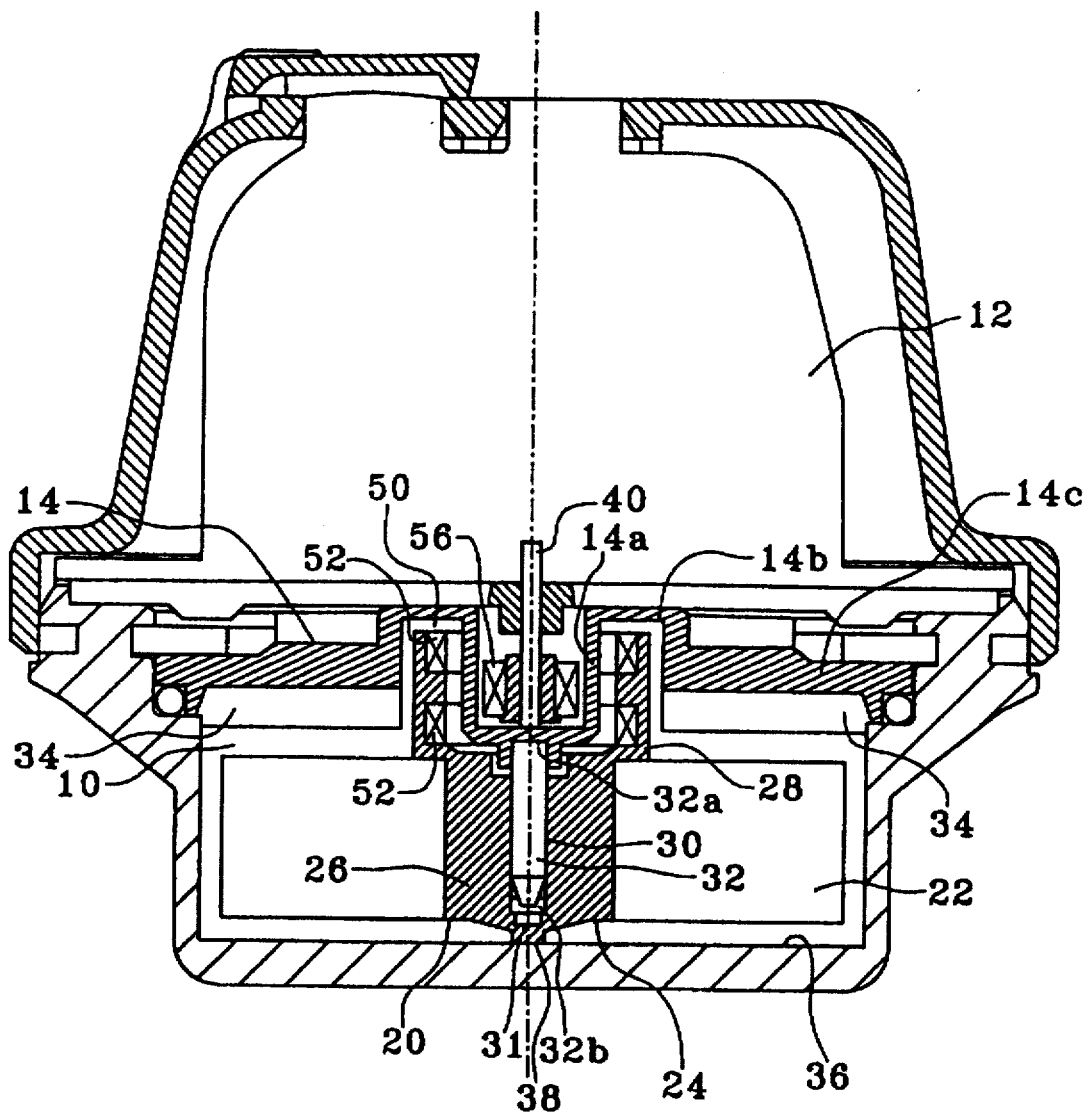
FIG. 1 is a diagrammatic longitudinal section through a water meter including a drive system by means of magnetic coupling and constituting an embodiment of the invention.

As shown in FIG. 1, and given overall reference 1, a fluid meter, and more particularly a water meter, comprises a drive system by means of magnetic coupling in accordance with the invention that is described below.

The water meter comprises two chambers 10 and 12 that are separated by a wall 14 that is watertight between said chambers. Water penetrates into a "measurement" first chamber 10 via an injector and it leaves it via an ejector, with the injector and the ejector not being shown in the plane of FIG. 1.

The meter also comprises an axial turbine provided with blades 22 which cause said turbine to rotate under the impact of the water jet coming from the injector. The turbine 20 may be made of a material whose relative density is close to 1, e.g. being equal to 0.9.

The axial turbine 20 has an axial shaft 24 made of a non-magnetic material and comprising firstly a hub 26 on which the blades 22 of the turbine are secured, and secondly a collar 28 at the top end of said hub and extending parallel to the axis of rotation of the turbine.

An axial duct 30 is formed in the axial shaft 24 for the purpose of receiving an axial pivot 32 which is secured to the watertight wall 14 at an axial end 32a of the pivot.

The pivot 32 has an opposite axial end 32b remote from its axial end 32a and of tapering shape. Thus, when the turbine is at rest, the axial end 32b of the pivot 32 is in contact with the bottom 31 of the axial duct 30. The measurement chamber also includes ribs or baffles 34 disposed at the top of said chamber and extending radially relative to the axis of rotation of the turbine. More precisely, the baffles are fixed to the watertight wall 14. When the turbine is caused to rotate under the effect of a flow of water, the bottom 31 of the axial duct 30 moves progressively away from the tapering end 32b of the pivot 32, and at high fluid speeds the turbine tends to come into contact with the bottom wall 36 of the measurement chamber 10 via an axial abutment 38, as can be seen in FIG. 1. The baffles 34 serve to provide the above-described function and also serve at high fluid speeds to generate a hydraulic braking torque which imparts good measuring qualities to the meter.

The second chamber 12 of the water meter includes a totalizer which is connected firstly to a shaft 40 that is concentric with the shaft of the turbine and that is suitable for rotating about the same axis of rotation, and secondly to a display device for displaying the volume of water that has been measured by the meter. The totalizer and the display device are not shown in FIG. 1.

As shown in FIG. 1, the watertight wall 14 has a central portion 14a that is offset towards the measurement chamber 10 so as to form a housing on the second chamber side, and a portion that projects into said measurement chamber 10.

The watertight wall also has an annular second portion 14b that forms a channel in the measurement chamber 10 surrounding the projecting first portion 14a and designed to receive the collar 28 of the turbine 20.

A substantially plane third portion 14c extends from the second portion 14b to the outer periphery of the watertight wall 14. The baffles 34 are fixed to this third portion 14c.

The water meter includes a magnetic coupling system 50 for driving two mechanical members in rotation about the axis of said meter, which members are the shafts 24 and 40 respectively associated with the turbine 20 and with the totalizer. Each of the magnetic members 24 and 40 has a corresponding magnetic element 52 or 56 fixed thereto. The two magnetic elements 52 and 56 are disposed in a concentric manner, i.e. one within the other, and they are separated by the watertight wall 14.

The drive system 50 by means of magnetic coupling and constituting the embodiment of the invention shown diagrammatically in FIG. 1 is further described with reference to FIGS. 2 and 3.

One of the magnetic elements 52 is secured to the collar 28 which extends the hub 26 of the turbine 20, thereby surrounding the housing and constituting the driving portion of the drive system.

The other magnetic element 56 is secured to the shaft 40 which is connected to the totalizer and it is disposed in the housing provided by the first portion 14a of the watertight wall 14 that is provided for this purpose. This magnetic element 56 constitutes the driven portion of the drive system and it is in axial abutment against the bottom of the housing constituted by the first portion 14a of the watertight wall 14, as shown in FIG. 1. The magnetic element 56 is constituted by a ring having a minimal radius $R_1$ and a maximum radius $R_2$.

At one of its axial ends, the shaft 40 is provided with a disk-shaped part 60 that extends perpendicularly of the axis of rotation in such a manner as to give said shaft an upside-down T-shape in the plane of FIG. 1, said disk 60 forming the cross-bar of the T-shape. As shown in FIG. 2, the ring 56 is provided in the disk 60 in such a manner that the midplanes of said disk and of the ring (both of which are perpendicular to the axis of rotation) coincide, and the maximum radius of the disk is equal to $R_2$.

In the measurement chamber 10, the magnetic element 52 constituting the driving portion of the drive system 50 is constituted by two identical rings 53 and 54 each having a minimum radius $R_3$ and a maximum radius $R_4$. In this configuration, and as shown in FIG. 3, the radii $R_1$ and $R_2$ are smaller than the minimum radius $R_3$, and the element 56 constituted by a single ring is the inner element of the drive system.

Figure 4:
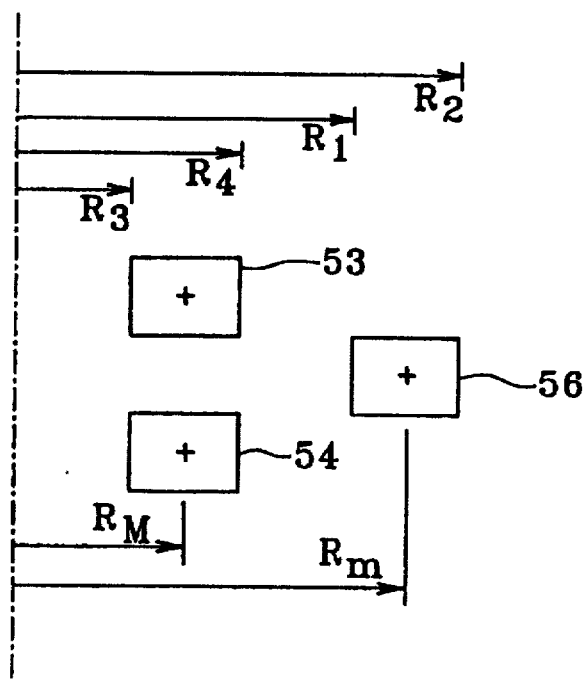
FIG. 4 is a fragmentary diagrammatic view of a variant embodiment of a drive system by means of magnetic coupling in accordance with the invention.

In a variant of the invention, as shown in FIG. 4, the driving magnetic element may be in the form of a ring 56 having a minimum radius $R_1$ and a maximum radius $R_2$, while the driven magnetic element 52 is in the form of a pair of rings having a minimum radius $R_3$ and a maximum radius $R_4$, as described above. In this variant, $R_1$ and $R_2$ are greater than the maximum radius $R_4$, and the element 56 constituted by a single ring is the outer element of the drive system 50.

Figure 2:
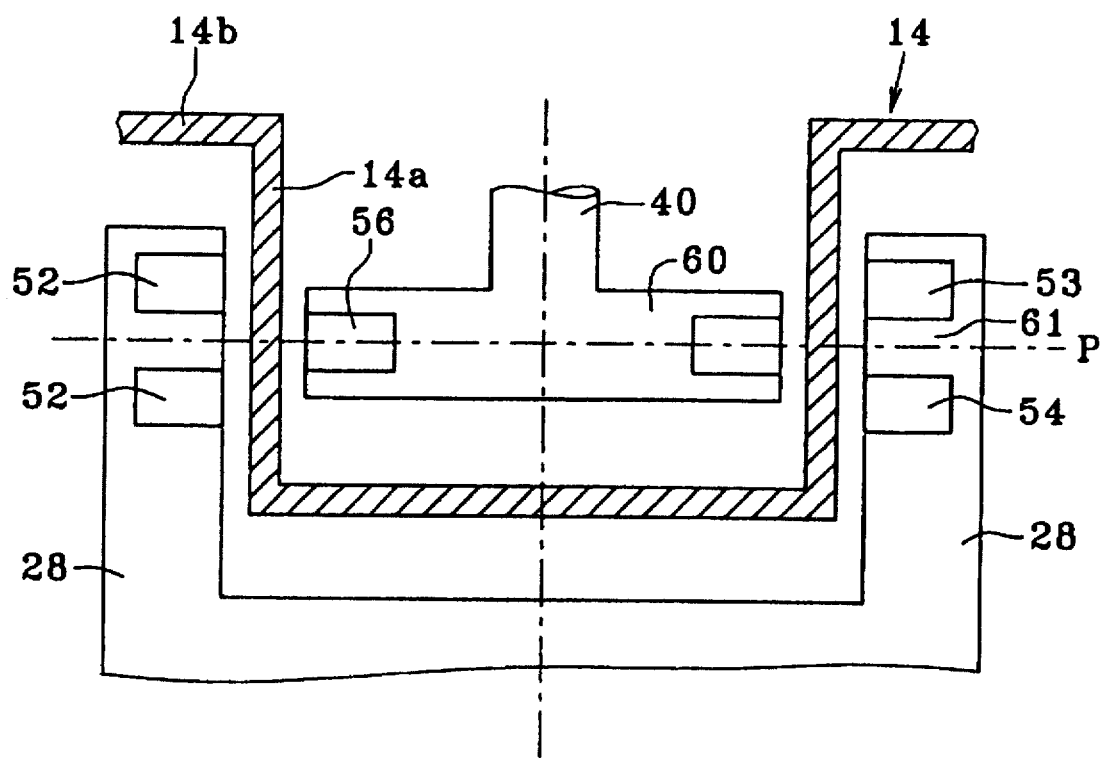
FIG. 2 is a diagrammatic view on a larger scale of the FIG. 1 drive system by means of magnetic coupling.

As shown in FIG. 2, the two rings 53 and 54 are mechanically secured to each other by means of the collar 28 to which they are secured.

A spacer-forming part 61 is disposed between the two rings 53 and 54 of the driving magnetic element 52. For example, the part 61 may be a portion of the collar 28 and it is made of a non-magnetic material.

As shown in FIG. 2, both the driving and the driven magnetic elements 52 and 56 have respective midplanes that are perpendicular to the axis of rotation, and the midplane of the driven magnetic element 56 coincides substantially with the midplane of the disk 60, which plane is referenced P.

Figure 3:
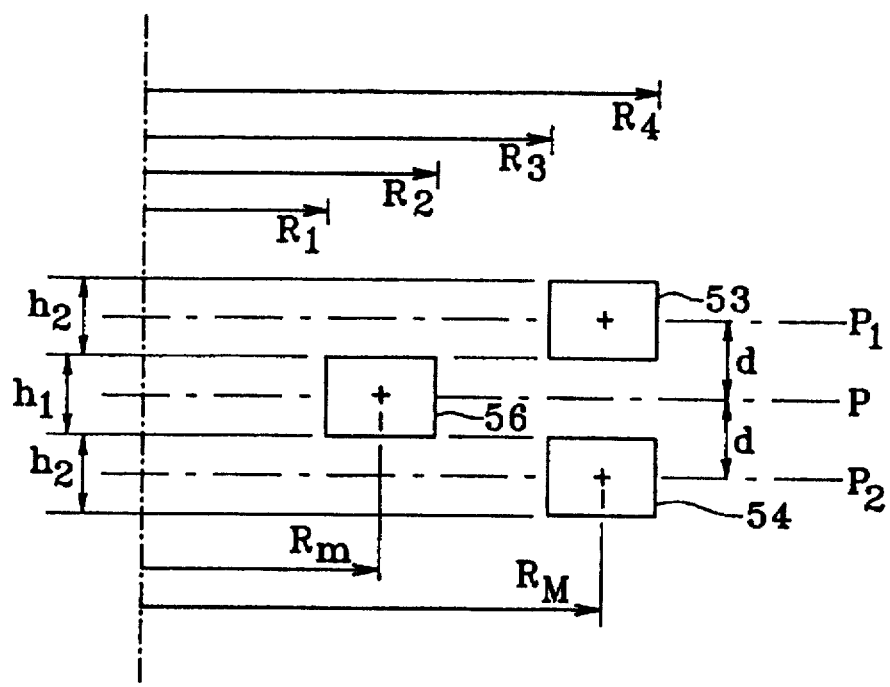
FIG. 3 is a fragmentary diagram of the FIG. 2 drive system by means of magnetic coupling.

In FIG. 3, the rings 53 and 54 of the driving magnetic element 52 have respective midplanes P1 and P2, each of which is axially offset by a distance d from the midplane P so as to lie on axially opposite sides of the ring of the driven magnetic element. In a plane containing the axis of rotation, such as the plane of FIGS. 1 and 3, all three rings 53, 54, and 56 are of right cross-section that is rectangular in shape. The right cross-section could be square in shape, for example. The axial extent or "height" of the ring 56 is written $h_1$, and the rings 53 and 54 are of identical height which is written $h_2$.

In the embodiment of the invention described with reference to FIGS. 1 and 3, both the driving and the driven magnetic elements 52 and 56 possess magnetization in the form of N poles uniformly distributed about the axis of rotation, where N is an even number that is greater than or equal to 2 and that depends on the intended application and on the performance expected of the drive system 50 by means of magnetic coupling in accordance with the invention. N is preferably equal to 4.

Figure 5:
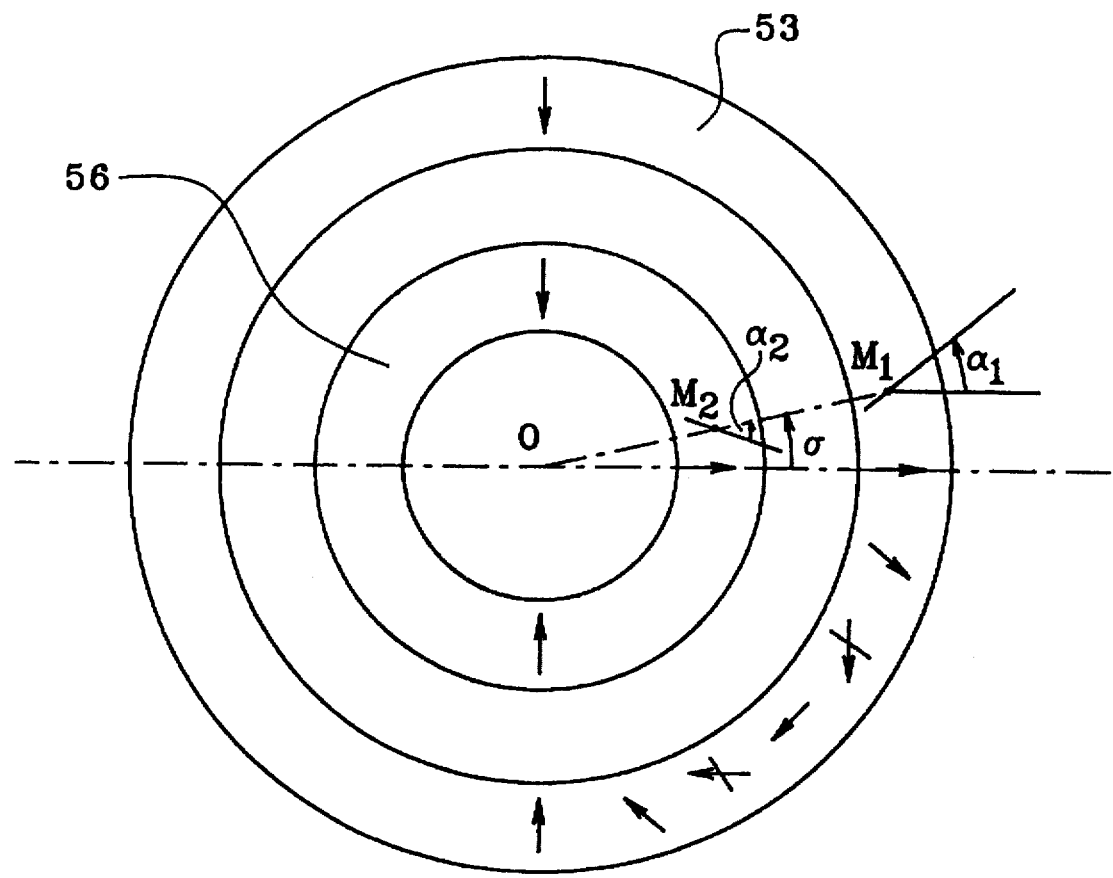
FIG. 5 is a diagrammatic plan view of the magnetization of the drive system by magnetic coupling in accordance with the invention.

The direction of the magnetization of each ring is contained in a plane perpendicular to the axis of rotation, and is of the type shown in FIG. 5. Each of the rings 53, 54, and 56 is magnetized in a continuous manner, i.e. each of them is constituted by a single piece of magnetic material. The magnetization of each of the rings preferably varies as a function of the angular position under consideration.

Thus, in a plane perpendicular to the axis of rotation, such as the plane of FIG. 5, defining the point O situated on said axis of rotation as the origin, and defining the horizontal line in the figure as defining an angle of 0°, two points M1 and M2 respectively belonging to one of the rings of the driving element 52 (in particular the ring 53) and to the ring 56 of the driven element are identified by their common angular position relative to said line.

For one of the rings of the driving element 52 (in particular the ring 53) which ring has the largest maximum radius $R_4$, the direction $\alpha_1$ of magnetization at angular position $\sigma$ satisfies the following relationship:

$$\alpha_1 = \tfrac{1}{2} N\sigma + \sigma, \text{ i.e. } \alpha_1 = 3\sigma \text{ when } N=4$$

and for the ring of the driven element, the direction $\alpha_2$ of magnetization at angular position $\sigma$ satisfies the relationship:

$$\alpha_2 = -\tfrac{1}{2} N\sigma + \sigma, \text{ i.e. } \alpha_2 = -\sigma \text{ for } N=4$$

In a variant that is not shown in the figures, it is possible to provide for the magnetization of each of the rings to be radial in direction.

Figure 6:
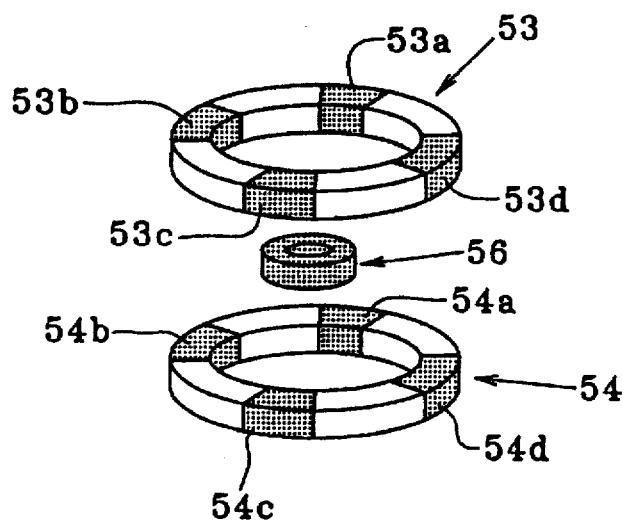
FIG. 6 is a diagrammatic perceptive view of variant magnetization for the drive system by magnetic coupling in accordance with the invention.

In another variant embodiment, it is possible for at least one of the elements of the drive system 50 to be magnetized discontinuously. As shown in FIG. 6, each ring 53, 54 of the driving element 52 has four ring portions 53a, 53b, 53c & 53d, and 54a, 54b, 54c, & 54d that are magnetized and regularly disposed in discontinuous manner around said ring 53 or 54. Each ring portion corresponds to a magnetization pole.

To hold together the magnetized ring portions of a single ring, a ring portion of non-magnetic material is interposed between two consecutive magnetic portions, with the non-magnetic material portion serving as a spacer.

It would also be possible to build up the ring from magnetic ring portions disposed contiguously around each ring. The driven magnetized element 56 is magnetized continuously and is constituted by a single magnetized ring. In this variant embodiment (FIG. 6), both the driving and the driven elements 52 and 56 are magnetized identically to the magnetization described above with reference to FIG. 5.

Figure 7:
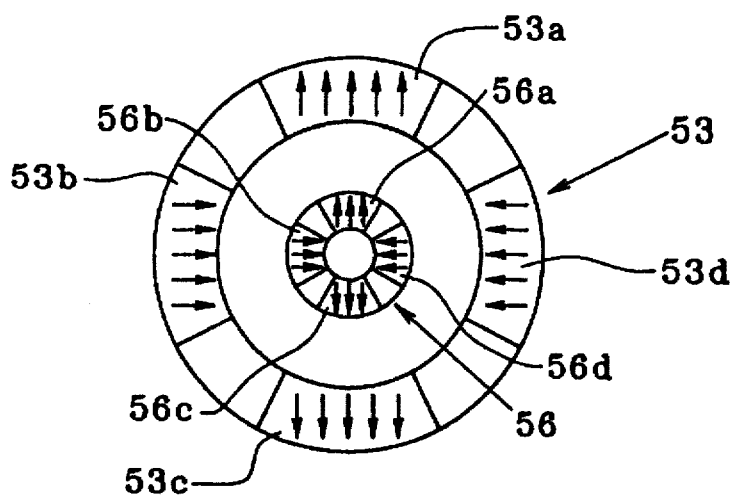
FIG. 7 is a diagrammatic plan view of another variant magnetization for the drive system by magnetic coupling in accordance with the invention.

It should be observed that a different variant embodiment is possible, as shown in FIG. 7. In this variant, the two magnetic elements 52 and 56 are magnetized discontinuously and each ring 53, 54, and 56 of the magnetized elements is constituted by an even number of ring portions, e.g. four, corresponding to the number of magnetization poles.

Each of the rings 53 and 54 comprises four respective ring portions 53a–d or 54a–d analogous to those visible in FIG. 6, which portions are thus disposed in a non-continuous manner around each ring. Likewise, the ring 56 comprises four ring portions 56a, 56b, 56c, & 56d that can be seen in FIG. 7 and that are disposed in non-continuous manner around said ring 56. Nevertheless, said ring portions 56a–d could equally well be contiguous. As shown in FIG. 7, each ring portion of each magnetic element is magnetized in a direction that is uniform and substantially radial. It would also be possible to cause each magnetic element to have ring portions in which the magnetization is exactly radial at any point on said ring portions.

According to the invention, when no torque is transmitted by the drive system 50, the magnetization of each ring is such that the poles of the inner magnetic element 56 face the poles of the outer magnetic element 52 so that poles of opposite kind face one another, i.e. north poles face south poles (FIG. 5). Such magnetic coupling is said to be "attractive".

Quite unexpectedly, the Applicant has discovered that the axial offset d of the midplanes P1 and P2 of each of the two rings 53 and 54 that are on axially opposite sides of the midplane P of the third ring 56 needs to satisfy the following relationship:

$$0.2 \leq 2d/|(R_3+R_4)-(R_1+R_2)| \leq 0.8$$

which can be rewritten as follows, using $R_M$ and $R_m$ to designate the respective mean radii of the two magnetic elements 52 and 56:

$$0.2 \leq d/|(R_M-R_m)| \leq 0.8$$

The above relationship defines a particular disposition of the three rings in the two magnetic elements 52 and 56 which is valid regardless of which element is driving or driven and regardless of the radial position of one of the elements relative to the other (FIGS. 3 and 4). When the configuration of the three rings satisfies the requirements of the relationship given above, the drive system 50 by means of magnetic coupling of the invention present real advantages over the prior art.

However, whenever the ratio $d/|(R_M-R_m)|$ is less than 0.2 or greater than 0.8, then radial and axial instabilities again become significant in the drive system.

Thus, in operation of the water meter 1 to which the drive system 50 is applied, the previously stationary turbine is caused to rotate about its axis and as a result the driving magnetic element 52 moves away from the position that it was occupying at rest in order to begin rotary motion. Because of the attractive magnetic forces acting between the rings 53, 54 of the driving element 52 and the ring 56 of the driven element while the turbine 20 is at rest, as soon as the driving element 52 begins to revolve, the poles of the inner ring 56 tend to follow the motion of the poles of the outer rings 53 and 54, thereby driving said inner ring in rotation and thus rotating the shaft 40 that is connected to the totalizer.

Advantageously, the particular disposition of the three rings makes it possible to reduce the axial and radial forces exerted between the two magnetic elements 52 and 56 to a considerable extent, and as a result the mechanical guides that carry said elements are subjected to forces that are low and that give rise to small amounts of friction. Consequently, the performance of the water meter is improved, and in particular its sensitivity is improved.

Preferably, when the ratio $h_1/(R_2-R_1)$ of the dimensions of the ring 56, and the ratio $h_2/(R_4-R_3)$ of the dimensions of each of the rings 53 and 54 lie in the range 1.5 to 0.66, then the ratio $2d/|(R_3+R_4)-(R1+R2)|$ lies in the range 0.3 to 0.65.

For example, when $R_1=1.55$ mm, $R_2=3.75$ mm, $h_1=4$ mm, $R_3=6$ mm, $R_4=7.5$ mm, $h_2=3$ mm and $d=2.7$ mm, then the ratio $2d/|(R_3+R_4)-(R_1+R_2)|$ is equal to 0.55. This preferred configuration is that shown in FIGS. 2 to 4 and it provides a considerable advantage, in particular greater compactness of the drive system.

If the dimensions of the rings are reduced so that each of the following dimensions: $h_1$, $(R_2-R_1)$, $h_2$, and $(R_4-R_3)$ is less than $(R_3-R_2)/4$, then the ratio $2d/|(R_3+R_4)-(R1+R2)|$ lies in the range 0.35 to 0.5 and the drive system 50 is even more compact than in the preceding case. For example when $R_1=1.5$ mm, $R_2=3.75$ mm, $h_1=1.5$ mm, $R_3=6$ mm, $R_4=7.5$ mm, $h_2=1.5$ mm, and $d=2$ mm, then the ratio $2d/|(R_3+R_4)-(R1+R2)|$ is equal to 0.41.

In addition, in these advantageous dispositions, the performance of the drive system 50 is improved in terms of the ratio of magnet weight to transmitted mechanical torque, i.e. for a given magnet mass, the transmitted torque can be higher than that of the drive system described in above-mentioned European patent No. 0 034 992.

Figure 8:
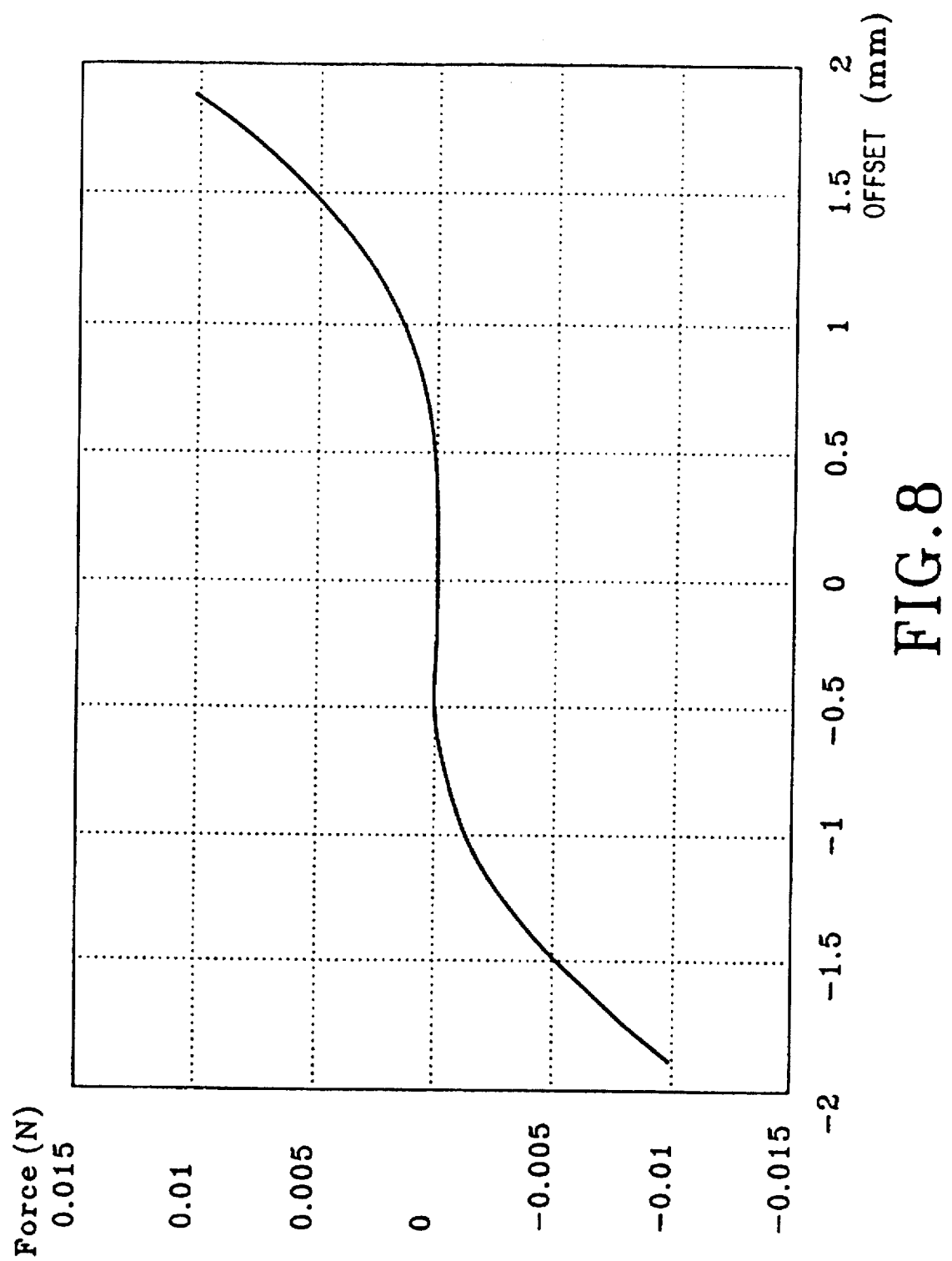
FIG. 8 is a graph showing variations in the axial force acting on the driven inner element of the FIG. 2 drive system by means of magnetic coupling plotted as a function of its axial offset from the position of the midplane P.

For the configuration obtained when $d=2.7$ mm, FIG. 8 shows the axial force exerted on the ring of the driven inner magnetic element 56 as a function of the axial offset of said element relative to the position of the midplane P.

In this figure, it can be observed firstly that the axial force exerted on the inner element is zero over a certain range about the centered vertical position, and secondly that the curve representing the variation in the axial force has a horizontal tangent which means that the drive system 50 by means of magnetic coupling in accordance with the invention possesses zero stiffness in this preferred configuration. As a result the instabilities of the drive system are particularly small in this case.

Furthermore, the Applicant has also observed that the drive system 50 by means of magnetic coupling in accordance with the invention limits the transmission of vibration between the driving element and the driven element.

Figure 9:
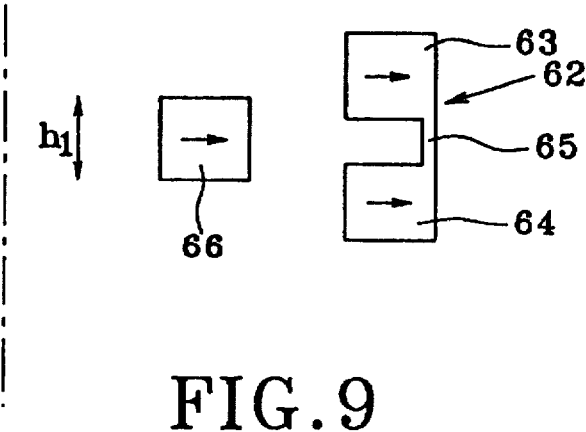
FIG. 9 is a fragmentary diagrammatic view of another embodiment of the drive system by means of magnetic coupling in accordance with the invention.

Another embodiment of the invention is shown in FIG. 9 which comprises an outer driving magnetic element 62 in the form of two identical rings 63 and 64 of minimum radius $R_3$ and maximum radius $R_4$ and an inner driven magnetic element 66 in the form of a single ring having a minimum radius $R_1$ and a maximum radius $R_2$, with the inner ring being located axially between the other two rings.

The two magnetic rings 63 and 64 of the outer magnetic element 66 are interconnected by means of a spacer-forming part 65. This part is constituted by a thin cylindrical wall 65 of magnetic material and it is magnetized identically to the magnetization in each of the rings, as described above. This characteristic can be most advantageous from the point of view of manufacturing the magnetic element 62. As shown in FIG. 9, the cylindrical wall 65 has a maximum radius equal to $R_4$ and a minimum radius that is greater than $R_3$. In a variant (not shown), the cylindrical wall 65 has a maximum radius that is smaller than $R_4$ and a minimum radius that is equal to $R_3$.

In a plane containing the axis of rotation, each of the rings 63, 64 and 66 possesses a right cross-section that is rectangular. Nevertheless, in yet another variant of the invention, the section may be identical for the two rings 63 and 64 of the outer magnetic element 62, while being different for the inner ring 66. The Applicant has observed that by adding a magnetic cylindrical wall 65 between the rings 63 and 64 of the outer element 62 and by increasing the axial or height direction of each of said rings relative to that of the inner ring 66, the drive system 50 presents technical effects that are highly advantageous in terms of absence of any force being created between the two portions of the magnetic coupling, and thus in terms of improved radial and axial stability. Nevertheless, these technical effects are obtained only on the condition that the axial or height dimension of the outer magnetic element 62 is greater than $2R_M+h_1$ where $R_M$ is the mean radius of one of the rings 63, 64. The displacement of the inner portion 66 relative to the outer portion 62 that is possible without giving rise to significant interaction forces is greater, but the axial size of the coupling is also greater.

We claim:

1. A drive system for rotating two mechanical members about an axis by means of magnetic coupling, the system comprising a magnetic element secured to each of said mechanical members, the two magnetic elements being concentric, the first of said magnetic elements possessing N magnetic poles regularly distributed about the axis of rotation in a ring having a minimum radius $R_1$ and a maximum radius $R_2$, where N is even, the second magnetic element possessing N magnetic poles regularly distributed about said axis of rotation in a first ring and N magnetic poles regularly distributed about the axis of rotation in a second ring identical to the first ring, where both rings have a minimum radius $R_3$ and a maximum radius $R_4$, said rings of said second magnetic element being mechanically secured to each other and each having a respective midplane perpendicular to the axis of rotation that is axially offset by a distance d from the midplane of the ring of the first magnetic element in such a manner as to lie on opposite axial sides of said first magnetic element, wherein said first and second magnetic elements are magnetically coupled by attractive forces, the magnetization of each magnetic element having a direction that is contained in a plane perpendicular to the axis of rotation, and wherein the ratio $2d/|(R_3+R_4)-(R_1+R_2)|$ lies in the range 0.2 to 0.8.

2. A drive system by means of magnetic coupling according to claim 1, wherein the ratio $2d/|(R_3+R_4)-(R1+R2)|$ preferably lies in the range 0.3 to 0.65 when $h_1/(R_2-R_1)$ and $h_2/(R_4-R_3)$ lie in the range 1.5 to 0.66, $h_1$ and $h_2$ being the axial or height dimensions respectively of the ring of the first magnetic element and of each of the rings and of the second magnetic element.

3. A drive system by means of magnetic coupling according to claim 2, wherein the ratio $2d/|(R_3+R_4)-(R1+R2)|$ lies even more preferably in the range 0.35 to 0.5, when each of the dimensions $h_1$, $(R_2-R_1)$, $h_2$, and $(R_4-R_3)$ is perceptibly less than $|R_3-R_2|/4$.

4. A drive system by means of magnetic coupling according to claim 1, wherein at least one of the magnetic elements is magnetized in continuous manner.

5. A drive system by means of magnetic coupling according to claim 1, wherein at least one of the magnetic elements is magnetized in discontinuous manner and wherein the ring(s) of said magnetic element is constituted by an even number of magnetic ring portions.

6. A drive system by means of magnetic coupling according to claim 5, wherein each magnetic ring portion has a direction of magnetization that is uniform and substantially radial.

7. A drive system by means of magnetic coupling according to claim 1, wherein the midplane of the first magnetic element substantially coincides with that of the second magnetic element.

8. A drive system by means of magnetic coupling according to claim 1, wherein in a plane containing the axis of rotation the right cross-section of each ring is substantially rectangular in shape.

9. A drive system by means of magnetic coupling according to claim 1, wherein at least one spacer-forming part is disposed between the two magnetic rings of the second magnetic element, and wherein the spacer-forming part is a cylindrical wall.

10. A fluid meter comprising a first chamber and a second chamber that are separated by a fluid-tight wall, the meter including a drive system by means of magnetic coupling according to claim 1, said fluid-tight wall forming a housing containing one of the magnetic elements with the other magnetic element surrounding said housing.

11. A fluid meter according to claim 10, wherein each of the mechanical members is a shaft, one of the shafts carries the magnetic element that is contained in the housing and is connected to a totalizer, while the other shaft carries the other magnetic element and forms a portion of an axial turbine.

* * * * *